United States Patent
Wang et al.

(10) Patent No.: US 12,162,613 B1
(45) Date of Patent: Dec. 10, 2024

(54) ENGINE ASSEMBLY FOR AN AIRCRAFT PROPULSION SYSTEM

(71) Applicant: Pratt & Whitney Canada Corp., Longueuil (CA)

(72) Inventors: Xi Wang, Montreal (CA); Jean Thomassin, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/367,286

(22) Filed: Sep. 12, 2023

(51) Int. Cl.
*B64D 27/24* (2024.01)
*B64D 27/10* (2006.01)
*B64D 27/02* (2006.01)

(52) U.S. Cl.
CPC ............. *B64D 27/24* (2013.01); *B64D 27/10* (2013.01); *B64D 27/026* (2024.01)

(58) Field of Classification Search
CPC ...... B64D 27/02; B64D 27/026; B64D 27/10; B64D 27/24; B64D 27/30; B64D 27/33; B64D 35/08; F02C 3/04; F02C 3/10; F02C 7/26; F02C 7/268; F02C 7/275; F02C 7/277; F02C 7/32; F02C 7/36; F02C 6/00; F02C 6/12; F02C 6/20; F02C 6/206; F05D 2220/323; F02B 53/14; F02B 41/10; F02B 73/00; F02B 61/04; F02B 37/20
See application file for complete search history.

(56) References Cited

U.S. PATENT DOCUMENTS

| | | | |
|---|---|---|---|
| 7,980,052 B1 | 7/2011 | Paulino | |
| 8,141,360 B1* | 3/2012 | Huber | F01K 23/065 290/40 B |
| 11,535,392 B2 | 12/2022 | Latulipe | |
| 2016/0245163 A1* | 8/2016 | Lamarre | F01C 1/22 |
| 2019/0375512 A1* | 12/2019 | Ribeiro | B64D 31/14 |
| 2023/0085551 A1* | 3/2023 | Dussault | F02B 53/10 123/205 |
| 2024/0151179 A1* | 5/2024 | Burd | F02C 7/32 |

* cited by examiner

*Primary Examiner* — Loren C Edwards
(74) *Attorney, Agent, or Firm* — Getz Balich LLC

(57) ABSTRACT

An engine assembly includes a propulsor, a gearbox, an engine, a gas turbine engine, and an electric control assembly. The gearbox includes a gear assembly coupled with the propulsor. The engine includes an air inlet, an exhaust outlet, and an engine output shaft. The engine output shaft is coupled with the gear assembly and configured to drive rotation of the propulsor through the gear assembly. The gas turbine engine includes a first rotational assembly, a compressor section, a turbine section, and a combustor. The compressor section is connected to the air inlet. The combustor is connected to the exhaust outlet. The combustor is configured to direct a combustion gas through the turbine section to drive rotation of the first rotational assembly. The electric control assembly includes a first electric motor. The first electric motor is coupled with the gear assembly. The first electric motor is configured to selectively apply a rotational force to the gear assembly to further drive rotation of the propulsor.

19 Claims, 2 Drawing Sheets

ENGINE ASSEMBLY FOR AN AIRCRAFT PROPULSION SYSTEM

TECHNICAL FIELD

This disclosure relates generally to an engine assembly for an aircraft propulsion system and, more particularly, to an engine assembly including an intermittent internal combustion engine and a gas turbine engine configured to cooperatively drive a propulsor of the aircraft propulsion system.

BACKGROUND OF THE ART

A propulsion system for an aircraft may be configured, for example, with an engine assembly including an intermittent internal combustion engine such as a rotary engine. Various configurations of such engine assemblies are known in the art. While these known engine assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine assembly for an aircraft propulsion system includes a propulsor, a gearbox, an engine, a gas turbine engine, and an electric control assembly. The gearbox includes a gear assembly coupled with the propulsor. The engine includes an air inlet, an exhaust outlet, and an engine output shaft. The engine output shaft is coupled with the gear assembly and configured to drive rotation of the propulsor through the gear assembly. The gas turbine engine includes a first rotational assembly, a compressor section, a turbine section, and a combustor. The first rotational assembly is configured for rotation about a rotational axis. The first rotational assembly includes a bladed compressor rotor for the compressor section, a bladed first turbine rotor for the turbine section, and a first shaft interconnecting the bladed compressor rotor and the bladed first turbine rotor. The compressor section is connected to the air inlet and configured to direct a compressed air to the air inlet. The combustor is connected to the exhaust outlet and configured to receive an exhaust gas from the exhaust outlet. The combustor is configured to direct a combustion gas through the turbine section to drive rotation of the bladed first turbine rotor. The electric control assembly includes a first electric motor and an energy storage device. The first electric motor is coupled with the gear assembly. The first electric motor is electrically connected to the energy storage device. The first electric motor is configured to selectively apply a rotational force to the gear assembly to further drive rotation of the propulsor through the gear assembly.

In any of the aspects or embodiments described above and herein, the gas turbine engine may further include a second rotational assembly. The second rotational assembly may include a bladed second turbine rotor for the turbine section and a second shaft. The second shaft may interconnect the bladed second turbine rotor and the gear assembly to further drive rotation of the propulsor through the gear assembly. The combustor may be configured to direct the combustion gas through the turbine section to drive rotation of the bladed first turbine rotor and the bladed second turbine rotor.

In any of the aspects or embodiments described above and herein, the second rotational assembly may be axially separated from the first rotational assembly.

In any of the aspects or embodiments described above and herein, the bladed second turbine rotor may be downstream of the first bladed turbine rotor with respect to the combustion gas.

In any of the aspects or embodiments described above and herein, the electric control assembly may further include a second electric motor. The second electric motor may be coupled with the first rotational assembly. The second electric motor may be electrically connected to the energy storage device.

In any of the aspects or embodiments described above and herein, the engine assembly may further include a controller including a processor in communication with a non-transitory memory storing instructions, which instructions when executed by the processor, may cause the processor to control the second electric motor to generate a first electrical power during a first operating condition of the engine assembly.

In any of the aspects or embodiments described above and herein, the instructions, when executed by the processor, may further cause the processor to control the first electric motor to apply the rotational force to the gear assembly during the first operating condition of the engine assembly while the second electric motor generates the first electrical power.

In any of the aspects or embodiments described above and herein, the instructions, when executed by the processor, may further cause the processor to control the second electric motor to generate the first electric power during the first operating condition of the engine assembly to charge the energy storage device.

In any of the aspects or embodiments described above and herein, the instructions, when executed by the processor, may further cause the processor to control the first electric motor to generate a second electrical power during a second operating condition of the engine assembly. The second operating condition may be different than the first operating condition.

In any of the aspects or embodiments described above and herein, the engine may be an intermittent internal combustion engine.

According to another aspect of the present disclosure, an engine assembly for an aircraft propulsion system includes a propulsor, a gearbox, an engine, and a gas turbine engine. The gearbox includes a gear assembly coupled with the propulsor. The engine includes an air inlet, an exhaust outlet, and an engine output shaft. The engine output shaft is coupled with the gear assembly and configured to drive rotation of the propulsor through the gear assembly. The gas turbine engine includes a first rotational assembly, a second rotational assembly, a compressor section, a turbine section, and a combustor. The first rotational assembly and the second rotational assembly are configured for rotation about a rotational axis. The first rotational assembly includes a bladed compressor rotor for the compressor section, a bladed first turbine rotor for the turbine section, and a first shaft interconnecting the bladed compressor rotor and the bladed first turbine rotor. The second rotational assembly includes a bladed second turbine rotor and a second shaft. The first shaft and the second shaft are operably coupled with the gear assembly to further drive rotation of the propulsor through the gear assembly. The compressor section is connected to the air inlet and configured to direct a compressed air to the air inlet. The combustor is connected to the exhaust outlet and configured to receive an exhaust gas from the exhaust outlet. The combustor is configured to direct a combustion gas through the turbine section to drive rotation of the bladed first turbine rotor.

In any of the aspects or embodiments described above and herein, the bladed second turbine rotor may be downstream of the first bladed turbine rotor with respect to the combustion gas.

In any of the aspects or embodiments described above and herein, the second rotational assembly may be axially separated from the first rotational assembly.

In any of the aspects or embodiments described above and herein, the engine assembly may further include an electric control assembly including a first electric motor and an energy storage device. The first electric motor may be coupled with the gear assembly. The first electric motor may be electrically connected to the energy storage device. The first electric motor may be configured to selectively apply a rotational force to the gear assembly to further drive rotation of the propulsor through the gear assembly.

In any of the aspects or embodiments described above and herein, the combustor may be disposed between the turbine section and the compressor section.

In any of the aspects or embodiments described above and herein, the engine assembly may further include a heat exchanger connected in fluid communication between the compressor section and the air inlet. The heat exchanger may be configured to cool the compressed air directed from the compressor section to the air inlet.

According to another aspect of the present disclosure, an engine assembly for an aircraft propulsion system includes a propulsor, a gearbox, an engine, and a gas turbine engine. The gearbox includes a gear assembly coupled with the propulsor. The engine includes an air inlet, an exhaust outlet, and an engine output shaft. The engine output shaft is coupled with the gear assembly and configured to drive rotation of the propulsor through the gear assembly. The gas turbine engine includes a first rotational assembly, a second rotational assembly, a compressor section, a turbine section, and a combustor. The first rotational assembly and the second rotational assembly are configured for rotation about a rotational axis. The first rotational assembly includes a bladed compressor rotor for the compressor section, a bladed first turbine rotor for the turbine section, and a first shaft interconnecting the bladed compressor rotor and the bladed first turbine rotor. The second rotational assembly includes a bladed second turbine rotor and a second shaft. The second shaft is coupled with the gear assembly to further drive rotation of the propulsor through the gear assembly. The compressor section is connected to the air inlet and configured to direct a compressed air to the air inlet. The combustor is connected to the exhaust outlet and configured to receive an exhaust gas from the exhaust outlet. The combustor is configured to direct a combustion gas through the turbine section to drive rotation of the bladed first turbine rotor.

In any of the aspects or embodiments described above and herein, the engine assembly may further include an electric control assembly including a first electric motor and an energy storage device. The first electric motor may be coupled with the gear assembly. The first electric motor may be electrically connected to the energy storage device. The first electric motor may be configured to selectively apply a rotational force to the gear assembly to further drive rotation of the propulsor through the gear assembly.

In any of the aspects or embodiments described above and herein, the electric control assembly may further include a second electric motor. The second electric motor may be coupled with the first rotational assembly. The second electric motor may be electrically connected to the energy storage device.

In any of the aspects or embodiments described above and herein, the engine assembly may further include a controller including a processor in communication with a non-transitory memory storing instructions, which instructions when executed by the processor, may cause the processor to control the second electric motor to generate a first electrical power during a first operating condition of the engine assembly and apply the rotational force to the gear assembly during the first operating condition of the engine assembly while the second electric motor generates the first electrical power.

The present disclosure, and all its aspects, embodiments and advantages associated therewith will become more readily apparent in view of the detailed description provided below, including the accompanying drawings.

DETAILED DESCRIPTION

Figure 1:
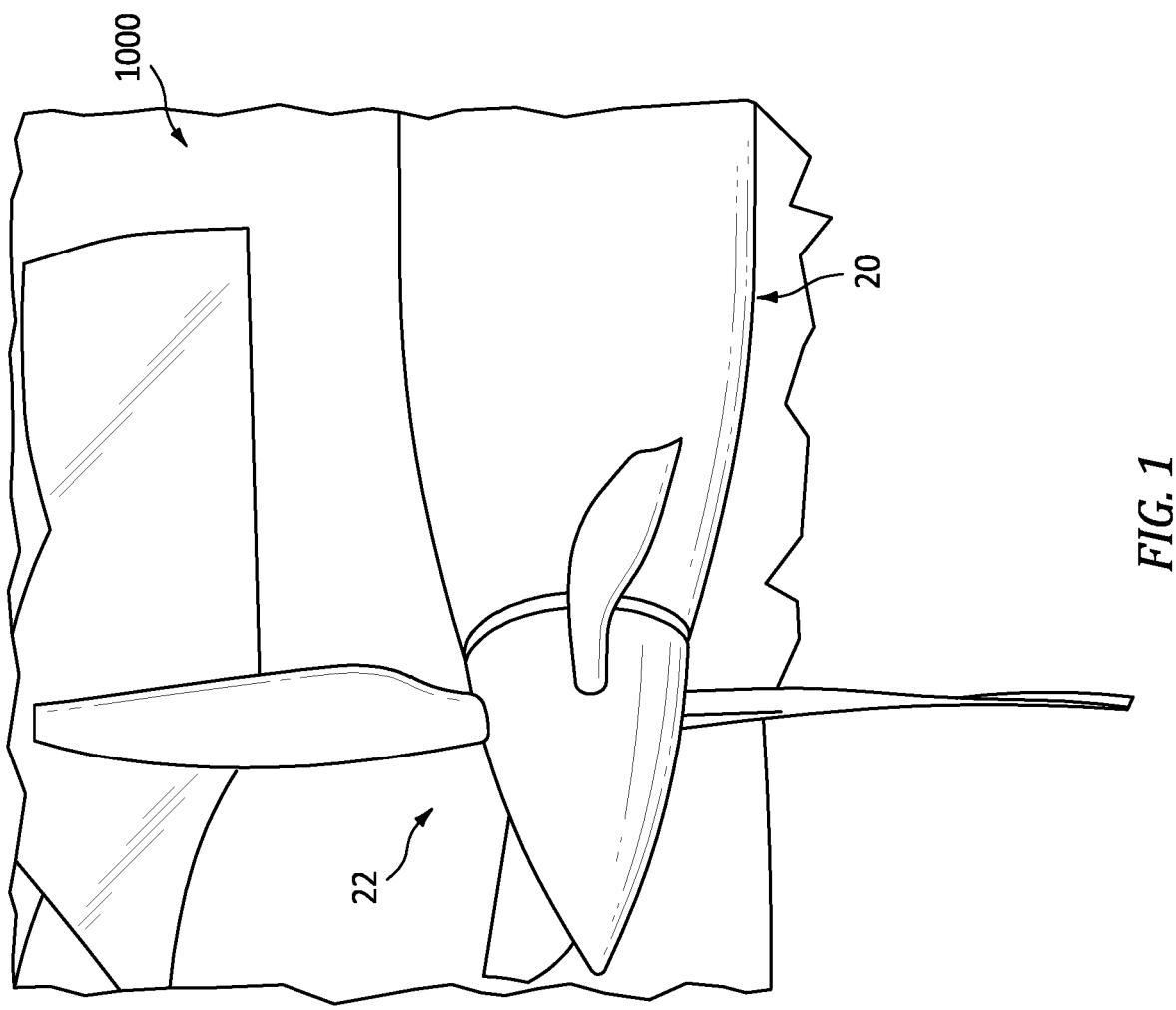
FIG. 1 illustrates a perspective view of aircraft including propulsion system, in accordance with one or more embodiments of the present disclosure.

FIG. 1 illustrates a perspective view of an aircraft 1000. Briefly, the aircraft 1000 may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The aircraft 1000 includes a propulsion system 20 and a propulsor 22. The propulsion system 20 is configured to drive rotation of the propulsor 22 to provide propulsion (e.g., generate thrust) for the aircraft 1000. The propulsor 22 of FIG. 1 is configured as a propeller, however, the present disclosure is not limited to any particular configuration of the propulsor 22.

Figure 2:
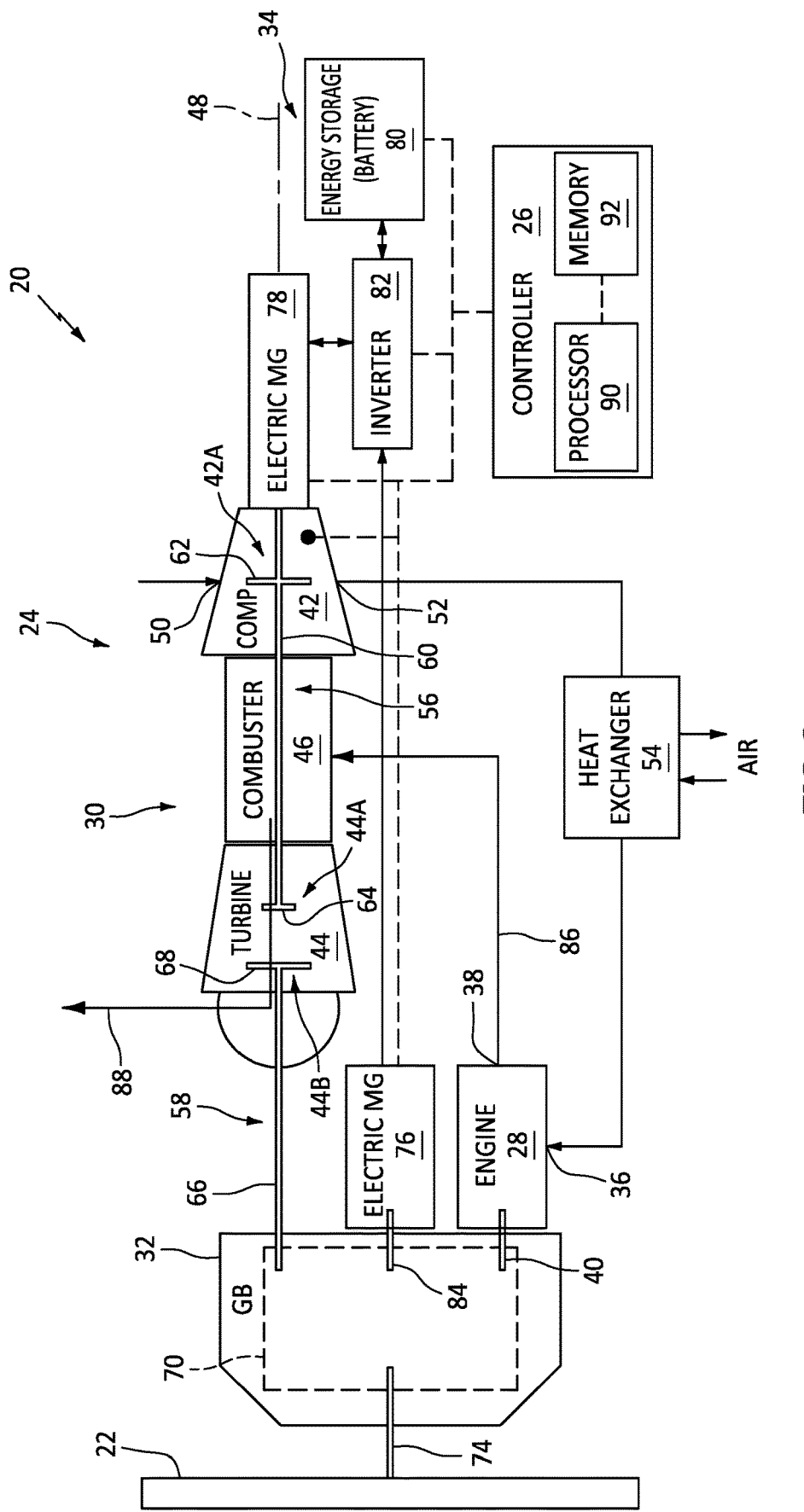
FIG. 2 schematically illustrates an engine assembly for an aircraft propulsion system, in accordance with one or more embodiments of the present disclosure.

FIG. 2 schematically illustrates the propulsion system 20. The propulsion system 20 of FIG. 2 includes a hybrid-electric engine assembly 24. The propulsion system 20 may additionally include a controller 26. The engine assembly 24 of FIG. 2 includes an engine 28, a gas turbine engine 30, a gearbox 32, and an electric control assembly 34.

The engine 28 of FIG. 2 is configured as an internal combustion engine using intermittent combustion during operation. The engine 28 may be an engine configuration other than a gas turbine engine configuration. For example, the engine 28 may be a reciprocating engine such as, but not limited to, a piston engine or a rotary engine (e.g., a Wankel engine). The engine 28 includes an air inlet 36, an exhaust outlet 38, and an engine output shaft 40. The engine 28 receives compressor air from the gas turbine engine 30 at the air inlet 36 and directs exhaust gas to the gas turbine engine 30 from the exhaust outlet 38, as will be discussed in further detail. The engine 28 drives rotation of the engine output shaft 40. The engine output shaft 40 is coupled with the gearbox 32 to drive, at least in part, rotation of the propulsor 22.

The gas turbine engine 30 of FIG. 2 includes a compressor section 42, a turbine section 44, and a combustor 46 arranged along a rotational axis 48 (e.g., an axial centerline) of the gas turbine engine 30. The compressor section 42 of FIG. 2 includes a compressor 42A. The turbine section 44 of FIG. 2 (e.g., a recovery turbine section) includes a high-pressure turbine 44A and a low-pressure turbine 44B (e.g., a power turbine). The combustor 46 may be disposed between the compressor section 42 and the turbine section 44 along the rotational axis 48.

The compressor section 42 includes an air inlet 50 and an air outlet 52. The air inlet 50 is connected in fluid communication with an air intake of the propulsion system 20 to receive a flow of ambient air from outside the propulsion system 20. The air outlet 52 is connected in fluid communication with the air inlet 36 to direct compressed air from the compressor 42A to the air inlet 36. The engine assembly 24 may include a heat exchanger 54 (e.g., an intercooler) connected in fluid communication between the air outlet 52 and the air inlet 36 to cool the compressed air directed to the air inlet 36 from the air outlet 52. The heat exchanger 54 may be configured to receive ambient air (e.g., from a propulsion system 20 air scoop or another air source) for cooling the compressed air. The present disclosure, however, is not limited to any particular cooling medium for the heat exchanger 54.

Components of the compressor section 42 and the turbine section 44 form a first rotational assembly 56 (e.g., a high-pressure spool) and a second rotational assembly 58 (e.g., a low-pressure or power spool) mounted for rotation about the rotational axis 48. While the gas turbine engine 30 is described herein as including a two-spool configuration, the present disclosure is also applicable to single-spool gas turbine engine configurations.

The first rotational assembly 56 includes a first shaft 60, a bladed compressor rotor 62 for the compressor 42A, and a bladed first turbine rotor 64 for the high-pressure turbine 44A. The first shaft 60 interconnects the bladed compressor rotor 62 and the bladed turbine rotor 64. The first shaft 60 is coupled with the electric control assembly 34, as will be discussed in further detail.

The second rotational assembly 58 includes a second shaft 66 and a bladed second turbine rotor 68 for the low-pressure turbine 44B. The second shaft 66 interconnects the bladed second turbine rotor 68 with the gearbox 32. The second shaft 66 is coupled with the gearbox 32 to drive, at least in part, rotation of the propulsor 22. The first shaft 60 and the second shaft 66 of FIG. 2 are axially separated and rotate about the rotational axis 48. The present disclosure, however, is not limited to the particular rotational assembly configuration of FIG. 2, and the first shaft 60 and the second shaft 66 may alternatively be concentric relative to the rotational axis 48. The first shaft 60 and the second shaft 66 may also alternatively be configured for rotation about discrete rotational axes.

The gearbox 32 of FIG. 2 includes a gear assembly 70. The gear assembly 70 is coupled with the engine drive shaft 40, the second shaft 66, and the electric control assembly 34 (e.g., an electric motor of the electric control assembly 34). Rotational inputs of the engine drive shaft 40, the second shaft 66, and the electric control assembly 34 are combined by the gear assembly 70 to drive rotation of the propulsor 22. For example, the gear assembly 70 may be additionally coupled with an input shaft 74 of the propulsor 22. The gear assembly 70 may include an epicyclic gear assembly (e.g., a planetary gear assembly) coupling the engine drive shaft 40, the second shaft 66, and the electric control assembly 34 with the propulsor 22. The present disclosure, however, is not limited to any particular gear configuration for the gear assembly 70.

The electric control assembly 34 of FIG. 2 includes a first electric motor 76, a second electric motor 78, and an energy storage device 80. The electric control assembly 34 may additionally include one or more inverters 82.

The first electric motor 76 includes a motor drive shaft 84 coupled with the gear assembly 70. The first electric motor 76 is configured to apply a rotational force to the gear assembly 70 to drive, at least in part, rotation of the propulsor 22. The first electric motor 76 may additionally be configured as a starter motor for the engine 28, for example, by applying a rotational force to the gear assembly 70 to drive rotation of the engine drive shaft 40. The first electric motor 76 may be configured as an AC motor (e.g., a synchronous AC motor, an induction AC motor, etc.) or a DC motor. The first electric motor 76 may additionally have a motor-generator (MG) configuration such that the first electric motor 76 may also generate electrical power for use by the second electric motor 78 and/or storage by the energy storage device 80. The first electric motor 76 is electrically connected to the energy storage device 80. For example, the first electric motor 76 of FIG. 2 is electrically connected to the energy storage device 80, in part, by the inverter 82. The inverter 82 is configured to control an electrical power supply (e.g., voltage, current, and frequency) to the first electric motor 76 to control operation (e.g., rotation speed, output torque, etc.) of the first electric motor 76. The inverter 82 may be configured to convert direct current (DC) electrical power from the energy storage device 80 to alternating current (AC) electrical power for use by the first electric motor 76. The inverter 82 may be further configured to convert AC electrical power generated by the first electric motor 76 to DC electrical power for storage by the energy storage device 80.

The second electric motor 78 is coupled with the first rotational assembly 56 (e.g., the first shaft 60). The second electric motor 78 may be directly coupled with the first shaft 60. Alternatively, the second electric motor 78 may be coupled with the first shaft 60 by a gearbox (e.g., a gear assembly), a clutch, or the like. The second electric motor 78 is configured to apply a rotational force to the first shaft 60 to selectively drive, at least in part, rotation of the first rotational assembly 56. The second electric motor 78 may be configured as an AC motor (e.g., a synchronous AC motor, an induction AC motor, etc.) or a DC motor. The second electric motor 78 may additionally have a motor-generator (MG) configuration such that the second electric motor 78 may also generate electrical power for use by the first electric motor 76 and/or storage by the energy storage device 80. The second electric motor 78 is electrically connected to the energy storage device 80. For example, the second electric motor 78 of FIG. 2 is electrically connected to the energy storage device 80, in part, by the inverter 82. The inverter 82 is configured to control an electrical power supply (e.g., voltage, current, and frequency) to the second electric motor 78 to control operation (e.g., rotation speed, output torque, etc.) of the second electric motor 78. The inverter 82 may be configured to convert direct current (DC) electrical power from the energy storage device 80 to alternating current (AC) electrical power for use by the second electric motor 78. The inverter 82 may be further configured to convert AC electrical power generated by the second electric motor 78 to DC electrical power for storage by the energy storage device 80. The first electric motor 76 and the second electric motor 78 may be electrically connected to a shared inverter 82, as shown in FIG. 2, which shared inverter 82 may control the operation of the first electric motor 76 and the second electric motor 78. Alternatively, the first electric motor 76 and the second electric motor 78 may be controlled by discrete inverters 82.

As previously discussed, the energy storage device 80 is electrically connected to the first electric motor 76 and the second electric motor 78 to supply electrical power to the electric motors 76, 78 and/or to store electrical power generated by the electric motors 76, 78. The energy storage device 80 may additionally supply electrical power to other components of the propulsion system 20 and/or the aircraft 1000 (see FIG. 1) such as, but not limited to, an aircraft environmental control system (ECS), aircraft 1000 and/or propulsion system 20 anti-icing systems, and hydraulic systems. The energy storage device 80 may be disposed within the propulsion system 20 or within the aircraft 1000 outside of the propulsion system 20. The energy storage device 80 may be any electrical device configured to store electrical energy. For example, the energy storage device 80 may be configured as a battery, a capacitor (e.g., a super-capacitor), or the like. The energy storage device 80, for example, may be configured as a battery including or otherwise being formed by a plurality of battery strings, battery modules, battery cells or the like. The present disclosure, however, is not limited to any particular configuration of the battery. The battery may have a battery chemistry configuration which includes materials forming the anode, cathode, and/or electrolyte of the battery. For example, the battery chemistry configurations for the battery may include, but are not limited to, lead acid, nickel cadmium (NiCd), nickel-metal hydride (Ni-MH), lithium-ion (Li-ion), lithium-polymer (Li-poly), lithium metal, alkaline, carbon zinc, and the like. The battery may be rechargeable or non-rechargeable. The battery may be rechargeable, for example, where the battery is configured to be discharged and subsequently recharged by receiving an electrical power (e.g., from an electrical power source). In other words, rechargeable battery may have a battery chemistry configuration for which the associated electrochemical reaction is reversible.

Operation of the engine 28 includes a first combustion stage (e.g., an intermittent internal combustion stage) for the engine assembly 24 in which a fuel (e.g., diesel fuel, kerosene fuel, etc.) is mixed and burned with the compressed air from the air inlet 36 and resultant combustion gas is exhausted from the engine 28 at the exhaust outlet 38 as exhaust gas 86. The exhaust gas 86 is directed from the exhaust outlet 38 to the combustor 46. Operation of the engine 28 drives rotation of the engine drive shaft 40 which, in turn, drives rotation of the propulsor 22 (e.g., through the gear assembly 70.

To facilitate a reduction in harmful exhaust emissions from the engine 28, the first combustion stage may include a lean fuel-to-air ratio. For example, the compressed air directed to the engine 28 from the compressor 42A, and subsequently mixed with the fuel, may be in excess of a stoichiometric ratio for the fuel-air mixture. As a result, the exhaust gas 86 from the engine 28 may include a substantial quantity of oxygen which was unused in the first combustion stage. Because a significant amount of engine assembly 24 power may be used in the operation of the compressor 42A to compress the air supplied to the engine 28, this unused oxygen in the exhaust gas 86 could, in at least some conventional aircraft propulsion systems, represent wastage of engine assembly 24 power and, therefore, reduced engine assembly 24 efficiency.

The exhaust gas 86 is directed to the combustor 46 to facilitate a second combustion stage for the engine assembly 24 in which a fuel is mixed and burned within the exhaust gas 86 within a combustion chamber of the combustor 46. The fuel directed to the combustor 46 for the second combustion stage may be the same as or different than the fuel used for the first combustion stage. This second combustion stage within the combustor 46 is accomplished with the unused oxygen in the exhaust gas 86 produced in the first combustion stage in the engine 28. As a result, additional engine power for the engine assembly 24 can be extracted by the gas turbine engine 30 using the unused oxygen in the exhaust gas 86.

Combustion gas 88 from the combustor 46 is directed through the high-pressure turbine 44A and the low-pressure turbine 44B. The bladed first turbine rotor 64 and the bladed second turbine rotor 68 rotationally drive the first rotational assembly 56 and the second rotational assembly 58, respectively, in response to the combustion gas 88 flow through the high-pressure turbine 44A and the low-pressure turbine 44B. In particular, the bladed first turbine rotor 64 drives rotation of the bladed compressor rotor 62 with the first shaft 60, thereby facilitating compression of ambient air for the engine 28. The bladed second turbine rotor 68 drives rotation of the propulsor 22 with the second shaft 66 (e.g., through the gear assembly 70) in combination with the engine 28 (e.g., the engine drive shaft 40) and/or the first electric motor 76. After flowing through the high-pressure turbine 44A and the low-pressure turbine 44B, the combustion gas 88 is exhausted from the propulsion system 20.

During some operational conditions of the engine assembly 24, an output power of the first rotational assembly 56 may be greater than work required by the compressor 42A to compressor ambient air for the engine 28. Accordingly, the electric control assembly 34 may selectively apply at least some rotational force from the first shaft 60 to the gear assembly 70. In other words, the electric control assembly 34 may operably couple the first rotational assembly 56 to the gear assembly 70 such that output power of the first rotational assembly 56 may be variably extracted by the electric control assembly 34 and applied for driving rotation of the propulsor 22 (e.g., in combination with the engine 28 and the second rotational assembly 58), thereby reducing engine 28 loading (e.g., fuel use) while maintaining the desired bladed compressor rotor 62 and propulsor 22 rotation speeds. For example, rotation of the first shaft 60 may drive the second electric motor 78 to generate electrical power and the electrical power generated by the second electric motor 78 may be used by the first electric motor 76 to apply rotational force to the gear assembly 70 to drive, at least in part, rotation of the propulsor 22. Additionally or alternatively, the electrical power generated by the second electric motor 78 may be stored by the energy storage device 80.

The controller 26 includes a processor 90 connected in signal communication with memory 92. The processor 90 may include any type of computing device, computational circuit, processor(s), CPU, computer, or the like capable of executing a series of instructions that are stored in the memory 92. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the engine assembly 24 and its components to accomplish the same algorithmically and/or by coordination of the engine assembly 24 components. The memory 92 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 26. The controller 26 may include, or may be in communication with, an input device that enables a user to enter data and/or instructions, and may include, or be in communication with, an output device configured, for example to display information (e.g., a visual display or a printer), or to transfer data, etc. Communications between the controller 26 and other electrical and/or electronic components (e.g., controllers, sensors, etc.) may be via a hardwire connection or via a wireless connection. A person of skill in the art will recognize that portions of the controller 26 may assume various forms (e.g., digital signal processor, analog device, etc.) capable of performing the functions described herein.

The controller 26 may form or otherwise be part of an electronic engine controller (EEC) for the engine assembly 24. For example, the EEC may control operating parameters of the engine 28 and/or the gas turbine engine 30 such as, but not limited to, fuel flow, stator vane position (e.g., variable compressor inlet guide vane (IGV) position), compressor air bleed valve position, shaft (e.g., first shaft 60 and/or second shaft 66) torque and/or rotation speed, etc. so as to control an engine power or performance of the engine assembly 24. The EEC may modulate fuel flow to the engine 28 and/or the combustor 46 to obtain a desired output power of the engine assembly 24. For example, the EEC may modulate the fuel flow using a closed-loop process in which an output power or other operating parameter of the engine assembly 24 is measured and fuel flow to the engine 28 and/or the gas turbine engine 30 is increased or decreased as a function of the measured output power or operational parameter. In some embodiments, the EEC may be part of a full authority digital engine control (FADEC) system for the propulsion system 20.

The controller 26 may include or otherwise be connected in signal communication with one or more sensors of the engine assembly 24 to measure operational parameters of the engine assembly 24. For example, the controller 26 of FIG. 2 is connected in signal communication with sensors 104 of the compressor section 42. The sensors 104 of FIG. 2 may include pressure and temperature sensors such as, but not limited to, a compressor inlet pressure sensor, a compressor outlet pressure sensor, a compressor inlet temperature sensor, and a compressor outlet temperature sensor to facilitate measurement of air flow parameters of the compressor section 42 by the controller 26. The sensors 104 of FIG. 2 may additionally include a rotation speed sensor to facilitate measurement of rotation speed of the first rotational assembly 56 (e.g., the bladed compressor rotor 62 speed) by the controller 26.

The controller 26 may be connected in signal communication with components of the electric control assembly 34 (e.g., the first electric motor 76, the second electric motor 78, the energy storage device 80, and the one or more inverters 82) to allow the controller 26 to control an amount of power which may be extracted from the first rotational assembly 56 and applied to the propulsor 22 (e.g., by the gear assembly 70). For example, the controller 26 may identify a target rotation speed for the first rotational assembly 56 (e.g., the bladed compressor rotor 62) to provide optimal compressed air flow for the engine 28 while also preventing the compressor section 42 from exceeding compressor surge and/or compressor stall operating limits. The target rotation speed may be identified, for example, using predetermined target rotation speed values (e.g., look-up tables or other databases) stored in memory 92 for the air flow parameters measured using the sensors 104. During some operational conditions of the engine assembly 24, an output power of the first rotational assembly 56 may be greater than work required by the compressor 42A to compress ambient air for the engine 28 (e.g., the first rotational assembly 56 rotation speed may be greater than the target rotation speed). Accordingly, the controller 26 may control electric control assembly 34 to selectively apply at least some rotational force from the first rotational assembly 56 to the propulsor 22. In other words, output power of the first rotational assembly 56 may be variably extracted by the electric control assembly 34 and applied for driving rotation of the propulsor 22 (e.g., in combination with the engine 28 and the second rotational assembly 58), thereby reducing engine 28 loading (e.g., fuel use) while maintaining the desired bladed compressor rotor 62 and propulsor 22 rotation speeds.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine assembly for an aircraft propulsion system, the engine assembly comprising:
   a propulsor;
   a gearbox including a gear assembly coupled with the propulsor;
   an engine including an air inlet, an exhaust outlet, and an engine output shaft, the engine output shaft is coupled with the gear assembly and configured to drive rotation of the propulsor through the gear assembly;
   a gas turbine engine including a first rotational assembly, a second rotational assembly, a compressor section, a turbine section, and a combustor, the first rotational assembly is configured for rotation about a rotational axis, the first rotational assembly includes a bladed compressor rotor for the compressor section, a bladed first turbine rotor for the turbine section, and a first shaft interconnecting the bladed compressor rotor and the bladed first turbine rotor, the second rotational assembly includes a bladed second turbine rotor for the turbine section and a second shaft, the second shaft interconnects the bladed second turbine rotor and the gear assembly to further drive rotation of the propulsor through the gear assembly, the compressor section is connected to the air inlet and configured to direct a compressed air to the air inlet, the combustor is connected to the exhaust outlet and configured to receive an exhaust gas from the exhaust outlet, and the combustor is configured to direct a combustion gas through the turbine section to drive rotation of the bladed first turbine rotor and the bladed second turbine rotor; and
   an electric control assembly including a first electric motor and an energy storage device, the first electric motor is coupled with the gear assembly, the first electric motor is electrically connected to the energy storage device, and the first electric motor is configured to selectively apply a rotational force to the gear assembly to further drive rotation of the propulsor through the gear assembly.

2. The engine assembly of claim 1, wherein the second rotational assembly is axially separated from the first rotational assembly.

3. The engine assembly of claim 1, wherein the bladed second turbine rotor is downstream of the first bladed turbine rotor with respect to the combustion gas.

4. The engine assembly of claim 1, wherein the electric control assembly further includes a second electric motor, the second electric motor is coupled with the first rotational assembly, and the second electric motor is electrically connected to the energy storage device.

5. The engine assembly of claim 4, further comprising a controller including a processor in communication with a non-transitory memory storing instructions, which instructions when executed by the processor, cause the processor to:
   control the second electric motor to generate a first electrical power during a first operating condition of the engine assembly.

6. The engine assembly of claim 5, wherein the instructions, when executed by the processor, further cause the processor to control the first electric motor to apply the rotational force to the gear assembly during the first operating condition of the engine assembly while the second electric motor generates the first electrical power.

7. The engine assembly of claim 5, wherein the instructions, when executed by the processor, further cause the processor to control the second electric motor to generate the first electric power during the first operating condition of the engine assembly to charge the energy storage device.

8. The engine assembly of claim 5, wherein the instructions, when executed by the processor, further cause the processor to control the first electric motor to generate a second electrical power during a second operating condition of the engine assembly, and the second operating condition is different than the first operating condition.

9. The engine assembly of claim 1, wherein the engine is an intermittent internal combustion engine.

10. An engine assembly for an aircraft propulsion system, the engine assembly comprising:
    a propulsor;
    a gearbox including a gear assembly coupled with the propulsor;
    an engine including an air inlet, an exhaust outlet, and an engine output shaft, the engine output shaft is coupled with the gear assembly and configured to drive rotation of the propulsor through the gear assembly; and
    a gas turbine engine including a first rotational assembly, a second rotational assembly, a compressor section, a turbine section, and a combustor, the first rotational assembly and the second rotational assembly are configured for rotation about a rotational axis, the first rotational assembly includes a bladed compressor rotor for the compressor section, a bladed first turbine rotor for the turbine section, and a first shaft interconnecting the bladed compressor rotor and the bladed first turbine rotor, the second rotational assembly includes a bladed second turbine rotor and a second shaft, the first shaft and the second shaft are operably coupled with the gear assembly to further drive rotation of the propulsor through the gear assembly, the compressor section is connected to the air inlet and configured to direct a compressed air to the air inlet, the combustor is connected to the exhaust outlet and configured to receive an exhaust gas from the exhaust outlet, and the combustor is configured to direct a combustion gas through the turbine section to drive rotation of the bladed first turbine rotor.

11. The engine assembly of claim 10, wherein the bladed second turbine rotor is downstream of the first bladed turbine rotor with respect to the combustion gas.

12. The engine assembly of claim 11, wherein the second rotational assembly is axially separated from the first rotational assembly.

13. The engine assembly of claim 11, further comprising an electric control assembly including a first electric motor and an energy storage device, the first electric motor is coupled with the gear assembly, the first electric motor is electrically connected to the energy storage device, and the first electric motor is configured to selectively apply a rotational force to the gear assembly to further drive rotation of the propulsor through the gear assembly.

14. The engine assembly of claim 11, wherein the combustor is disposed between the turbine section and the compressor section.

15. The engine assembly of claim 11, further comprising a heat exchanger connected in fluid communication between the compressor section and the air inlet, and the heat exchanger is configured to cool the compressed air directed from the compressor section to the air inlet.

16. An engine assembly for an aircraft propulsion system, the engine assembly comprising:
 a propulsor;
 a gearbox including a gear assembly coupled with the propulsor;
 an engine including an air inlet, an exhaust outlet, and an engine output shaft, the engine output shaft is coupled with the gear assembly and configured to drive rotation of the propulsor through the gear assembly; and
 a gas turbine engine including a first rotational assembly, a second rotational assembly, a compressor section, a turbine section, and a combustor, the first rotational assembly and the second rotational assembly are configured for rotation about a rotational axis, the first rotational assembly includes a bladed compressor rotor for the compressor section, a bladed first turbine rotor for the turbine section, and a first shaft interconnecting the bladed compressor rotor and the bladed first turbine rotor, the second rotational assembly includes a bladed second turbine rotor and a second shaft, the second shaft is coupled with the gear assembly to further drive rotation of the propulsor through the gear assembly, the compressor section is connected to the air inlet and configured to direct a compressed air to the air inlet, the combustor is connected to the exhaust outlet and configured to receive an exhaust gas from the exhaust outlet, and the combustor is configured to direct a combustion gas through the turbine section to drive rotation of the bladed first turbine rotor.

17. The engine assembly of claim 16, further comprising an electric control assembly including a first electric motor and an energy storage device, the first electric motor is coupled with the gear assembly, the first electric motor is electrically connected to the energy storage device, and the first electric motor is configured to selectively apply a rotational force to the gear assembly to further drive rotation of the propulsor through the gear assembly.

18. The engine assembly of claim 17, wherein the electric control assembly further includes a second electric motor, the second electric motor is coupled with the first rotational assembly, and the second electric motor is electrically connected to the energy storage device.

19. The engine assembly of claim 18, further comprising a controller including a processor in communication with a non-transitory memory storing instructions, which instructions when executed by the processor, cause the processor to:
 control the second electric motor to generate a first electrical power during a first operating condition of the engine assembly; and
 apply the rotational force to the gear assembly during the first operating condition of the engine assembly while the second electric motor generates the first electrical power.

* * * * *